United States Patent
Chang

(10) Patent No.: US 6,567,769 B2
(45) Date of Patent: May 20, 2003

(54) UNATTENDANT DATA CENTER ENVIRONMENT PROTECTION, CONTROL, AND MANAGEMENT SYSTEM

(75) Inventor: Her-Lin Chang, Shen Keng Shiang (TW)

(73) Assignee: DigiPower Manufacturing Inc., Taipei (TW)

( * ) Notice: Subject to any disclaimer, the term of this patent is extended or adjusted under 35 U.S.C. 154(b) by 0 days.

(21) Appl. No.: 09/840,158

(22) Filed: Apr. 24, 2001

(65) Prior Publication Data

US 2002/0156600 A1 Oct. 24, 2002

(51) Int. Cl.[7] .......................... G06F 11/00; G06F 15/00
(52) U.S. Cl. ................. 702/188; 340/286.09; 340/539; 363/95; 379/102.04; 705/41
(58) Field of Search ........................ 702/62, 122, 127, 702/188; 379/102.04; 340/3.1–3.9, 286.09, 539; 363/95; 455/445; 705/41

(56) References Cited

U.S. PATENT DOCUMENTS

| | | | | |
|---|---|---|---|---|
| 5,019,803 A | * | 5/1991 | Maram | 340/539 |
| 5,596,492 A | * | 1/1997 | Divan et al. | 363/95 |
| 5,774,050 A | * | 6/1998 | Kagi | 340/539 |
| 5,900,801 A | * | 5/1999 | Heagle et al. | 340/286.09 |
| 6,122,350 A | * | 9/2000 | Reeder et al. | 379/102.04 |
| 6,216,956 B1 | * | 4/2001 | Ehlers et al. | 236/47 |
| 6,339,765 B1 | * | 1/2002 | Maher | 705/41 |

* cited by examiner

Primary Examiner—John Barlow
Assistant Examiner—John Le
(74) Attorney, Agent, or Firm—Rosenberg, Klein & Lee

(57) ABSTRACT

This unattendant data center environment protection, control and management system is able to provide means for monitoring temperature and humidity, managing power supply, and controlling access condition for a protected zone, and further, able to achieve the aim of remote control and management effect in any situation and from any distance by means of phone communication, interconnection to local network, or the internet web.

6 Claims, 1 Drawing Sheet

UNATTENDANT DATA CENTER ENVIRONMENT PROTECTION, CONTROL, AND MANAGEMENT SYSTEM

BACKGROUND OF THE INVENTION

1. Field of the invention

The present invention relates to unattendant data center environment protection, control, and management system, in particular, a system which can provide means for monitoring temperature and humidity, managing power supply, and controlling entry to a protected zone. Moreover, the system of the present invention is able to achieve the aim of remote control and management effect in any situation and distance bye means of phone communication, interconnection to local network, or the internet web.

2. Description of the Prior Art

How to maintain environmental security is an important concern of people with the first priority. Most of the people rely on too much to door lock device thinking that the degree of security increases in propotion to the amount of door locks installed. In actual situation, it is regretful that even a sophisticated lock is unable to fully protect itself from being broken by an alert and skilful burgler!

The recently invented security system contributed to ensuring the environmental security a lot. However, a security system must be handled, controlled, and managed by specialized security personnel. As soon as an alarm signal informing abnormality is received, the clew who are patrolling nearest the site are dispatched there to exclude the emergency, but such a time-delayed response is by no means relevantly appreciable because it has already lost the critical time to protect the customer.

In order to solve the above described problem, the present inventor carried out theoretical studies and simulating experiments. Base on these studies and researches, the present inventor came to propose this invention.

SUMMARY OF THE INVENTION

It is an object of the present invention to provide unattendant data center environment protection, control, and management system which can provide means for monitoring temperature and humidity, managing power supply, and controlling access condition for a protected zone.

It is another object of the present invention to provide aforesaid system which is able to carry out the aforesaid missions remotely and relevantly in any situation and distance by means of phone communication, interconnection to local network, or the internet web.

To achieve these and other objects described above, the system of the present invention comprises an ECM (environment control and management) security subsystem, an ECM power switch subsystem, an ECM power sharing subsystem, and an ECM power Uninterruptible Power Supply (UPS) subsystem. By operation of these subsystems, it is able to conduct missions of monitoring temperature and humidity, managing power supply, and controlling entry to a protected zone from a control center, and to carry out the aforesaid missions remotely and relevantly in any situation and distance by means of phone communication, interconnection to local network, or the internet web.

BRIEF DESCRIPTION OF THE DRAWINGS

The drawing discloses an illustrative embodiment of the present invention which serves to exemplify the various advantages and objects hereof, and are as follows.

DETAILED DESCRIPTION OF THE PREFERRED EMBODIMENT

Figure 1:
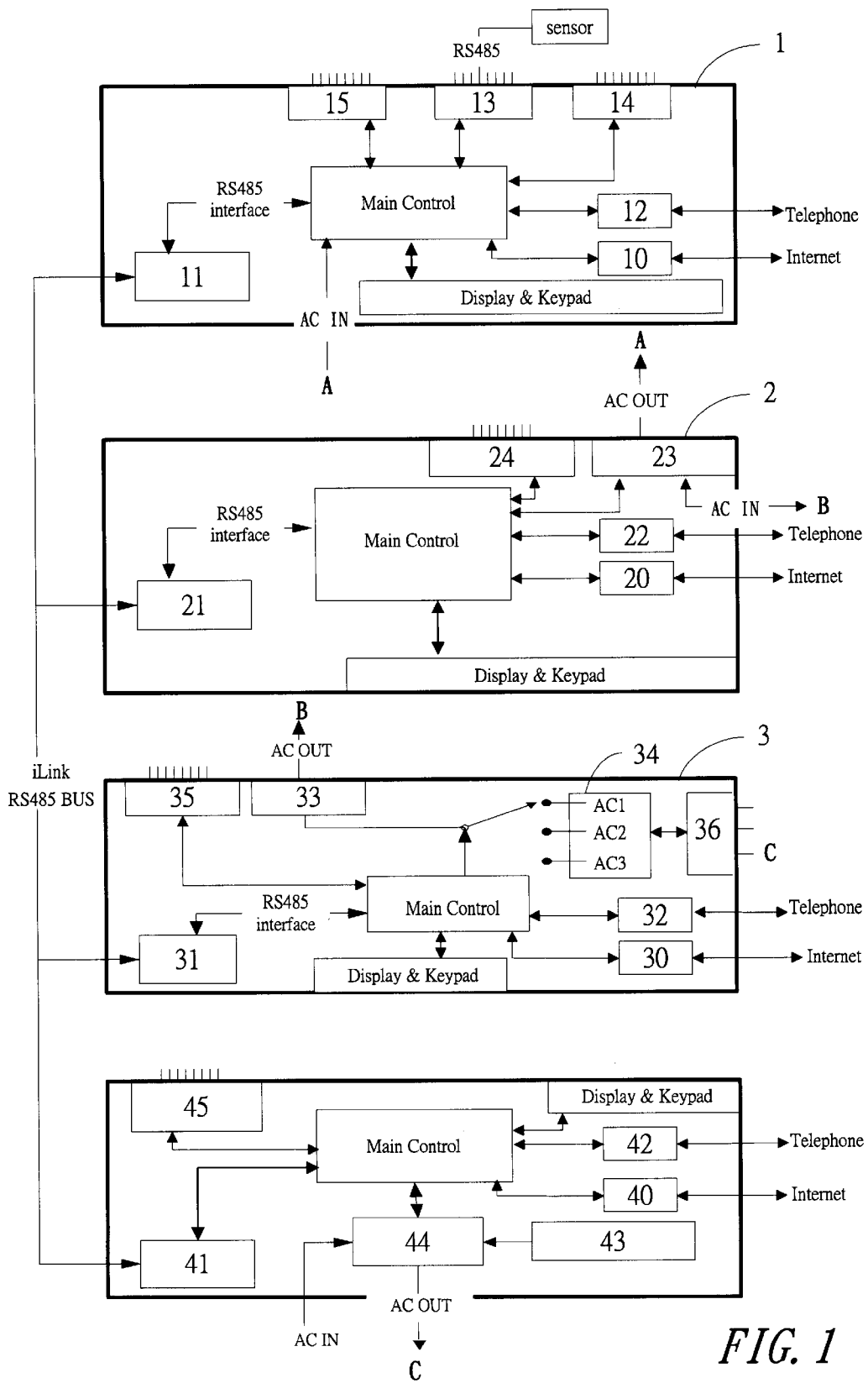
FIG. 1 is a circuit scheme for unattendent data center environment protection, control, and management system according to the present invention.

Referring to FIG. 1, unattendant data center environment protection, control and management system of the present invention comprises an ECM security subsystem 1; an ECM power switch subsystem 2; an ECM power sharing subsystem 3; and an ECM power UPS subsystem 4.

The ECM security subsystem 1 further includes: a smart slot 10 incorporative with a web card, through the smart slot, the ECM security subsystem 1 can be operated with the connection to the TCP/IP Ethernet, all the status of environment including power switch, equipment power loads, power, humidity, temperature, and access condition can be programmed, controlled and managed by the web card through internet; a link port 11 from which the ECM security system 1 can be linked to another subsystem through the 485 interface of the subsystem; a phone port 12 incorparative with a phone card, throught phone port 12 the ECM security subsystem 1 can be operated with the connection to a phone line, all the status of environment including power switch, equipment power loads, power, humidity, temperature and access condition can programmed, controlled and managed by a phone through Public Switched Telephone Network (PSTN); dynamic sensor ports 13 through them the ECM security subsystem 1 can be connected with 8 dynamic sensors including humidity, temperature, vibration, gas and digital voice/video to detect the environmental conditions; static sensor ports 14, through them the ECM security subsystem 1 can be connected with 8 sensors including door, window, water, fire and thermal to detect the environmental conditions; and communication ports 15, through them the ECM security subsystem 1 can control 8 equipment/computers connected thereof to respond the corresponding sensor statue.

The ECM power switch subsystem 2 further includes a smart slot 20 incorporative with the web card, through the smart slot 20 the ECM power switch subsystem 2 can be operated with the connection to the TCP/IP Ethernet, all the status of environment including power switch, equipment power loads, power, humidity, temperature, and access condition can be programmed, controlled, and managed by a web card through internet; a link port 21 from there the ECM power switch subsystem can be linked to another subsystem through the 485 interface of the subsystem; a phone port 22 incorporative with a phone card, therethrough the ECM power switch subsystem 2 can be controlled and managed with the connection of a telephone, all the status of environment including power switch, equipment power loads, power, humidity, temperature, and access condition can be programmed, controlled and managed by the phone through PSTN; power switch outlets 23 through which the ECM power switch subsystem 2 can control ON/OFF of the equipment connected to these outlets 23, the way of control is programmable into a schedule; and communication ports 24 through which the ECM power switch subsystem 2 can control 8 equipment/computers connected therewith to respond the corresponding power switch outlet status.

The ECM power sharing subsystem 3 further includes; a smart slot 30 incorporative with the web card, through the smart slot 30 the ECM power sharing subsystem 3 can be controlled and managed with the connection of the TCP/IP Ethernet, all the status of environment including power switch, equipment power loads, power, humidity, temperature, access condition can be programmed, controlled and managed by the web card through internet; a link port 31 from which the ECM power sharing subsystem 3 can be linked to another system through the 485 interface of the subsystem; a phone port 32 incorporative with the phone card, through the phone port 32 the ECM power sharing subsystem 3 can be controlled and managed with the connection of a telephone all the status of environment including power switch, equipment power loads, power, humidity, temperature, access condition can be programmed, controlled and managed by a phone through PSTN; power loads outlets 34 through which the ECM power sharing subsystem 3 can control the load of equipment connected to these load outlets 34; a AC source input power connection 33 through which the ECM power sharing subsystem 3 can control the load of equipment connected to these load outlets 34 to one of the connected AC sources; load communication ports 35, through which the ECM power sharing subsystem 3 can control 8 equipment/computers connected to respond the corresponding load and AC power sources; and AC source communication ports 36 which have three input terminals for receiving power supply from utility source or UPS source, through these ports 36 the ECM power sharing subsystem 3 can synchronize the connected AC power sources.

The ECM power UPS subsystem 4 further includes: a smart slot 40 incorporative with the web card, through the smart slot 40, the ECM power UPS subsystem 4 can be controlled and managed with the connection of the TCP/IP Ethernet, all the status of environment including power switch, equipment power loads, power, humidity, temperature, access condition can be programmed, controlled and managed by the web card through internet; a link port 41 from here the ECM power UPS subsystem 4 can be linked to another subsystem through the 485 interface of the subsystem; a phone port 42 incorparative with the phone card, through the phone port 42 the ECM power UPS subsystem 4 can be controlled and managed with the connection to a telephone, all the status of environment including power switch, equipment power loads, humidity, temperature, access condition can be programmed, controlled, and managed by a phone through PSTN; a power back up battery unit 43 for supplying back up power through an inverter 44 in outage of the normal power supply; and UPS communication ports 45 through which the ECM power UPS subsystem 4 can control 8 equipment/computers connected to respond the corresponding UPS status.

With the aforementioned subsystems, the unattendant data center environment protection, control, and management system of the present invention is able to carry out its mission with a piece of phone card installed in anyone of the subsystems, and by interconnecting all the link ports of the subsystems, each subsystem is able to equivalently function. In occurrence of any abnormal condition, the information is sent to a defined spot, while the web card can similarly control the area in distal side.

In practical application, the equipment of the data center is connected to the ECM power switch subsystem 2 to control the power switch according to the situation detected by the ECM security subsystem 1. Node A of the ECM security subsystem 1 is connected to that of the ECM power switch subsystem 2; Node B of the ECM power switch subsystem 2 is connected to that of the ECM power sharing subsystem 3; and Node C of the ECM power sharing system 3 is connected to that of the ECM power UPS subsystem 4.

It emerges from the above description that the present invention has several noteworthy advantages over those prior systems, in particular:

1. The system of the present invention can perform the missions of environment protection, control and management for an unattendant data center.
2. The system of the present invention can provide means for monitoring temperature and humidity, managing power supply, and controlling access condition f, a protected zone.
3. The system of the present invention can perform aforesaid mission remotely and relevantly in any situation and distance by means of phone communication, interconnection to local community network, or the internet.

Many changes and modification in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An unattended data center environment protection, control and management system for monitoring and controlling environmental conditions, monitoring and controlling operating power status, and monitoring and controlling access to restricted zones of a data center, said unattended data center environment protection, control and management system comprising:

a power sharing subsystem electrically coupled to a plurality of power source input terminals and selectively providing at an output terminal thereof electrical power from one of a plurality of power sources respectively coupled to said power source input terminals, said power sharing subsystem including an electrical power port coupled to said plurality of power input terminals for synchronizing said plurality of power sources and a plurality of load communication ports for controlling equipment coupled thereto in response to load demands at said output terminal and supply status of said plurality of power sources;

a power switch subsystem electrically coupled to and deriving electrical power directly from said power sharing subsystem and selectively providing at each of a plurality of outlets thereof said electrical power from said power sharing subsystem, said power switch subsystem including a plurality of switch communication ports for controlling equipment coupled thereto in response to operational status of at least one of said plurality of outlets;

a security subsystem electrically coupled to and deriving electrical power directly from said power switch subsystem and including a plurality of dynamic sensor ports for coupling to a corresponding plurality of dynamic sensors for monitoring continuously variable environmental conditions, a plurality of static sensor ports for coupling to a corresponding plurality of static sensors for monitoring discrete-valued variable environmental conditions, and a plurality of communication ports for controlling equipment coupled thereto in response to said continuously variable environmental conditions and said discrete-valued variable environmental conditions; and an uninterruptible power supply subsystem including an uninterruptible power supply and electrically coupled to an external power source, said uninterruptible power supply subsystem providing at an output terminal thereof electrical power, said electrical power being provided to said power sharing subsystem as one of said plurality of power sources, said uninterruptible power supply subsystem further including a plurality of uninterruptible power supply communication ports for controlling equipment coupled thereto in response to operational status of said uninterruptible power supply, wherein said power sharing subsystem, said power switch subsystem, said security subsystem and said uninterruptible power supply subsystem are interconnected by means of a local communication bus and each of said power sharing subsystem, said power switch subsystem, said security subsystem and said uninterruptible power supply subsystem include network communication means for communicating with a remote operator.

2. The unattended data center environment protection, control and management system as recited in claim 1, wherein said network communication means includes means for communicating over a Public Telephone Switched Network (PTSN).

3. The unattended data center environment protection, control and management system as recited in claim 1, wherein said network communication means includes means for communicating using Transmission Control Protocol/Internet Protocol (TCP/IP).

4. The unattended data center environment protection, control and management system as recited in claim 1, wherein said local communication bus is RS-485 compliant.

5. The unattended data center environment protection, control and management system as recited in claim 1, wherein corresponding ones of said plurality of dynamic sensors are adapted to measure humidity, temperature, vibration, gaseous content, and digital voice/video.

6. The unattended data center environment protection, control and management system as recited in claim 1, wherein corresponding ones of said static sensors are adapted to detect the open/closed states of doors and windows, presence of water, presence of fire, and presence of heat.

* * * * *